United States Patent [19]

Song et al.

[11] Patent Number: 5,288,781

[45] Date of Patent: Feb. 22, 1994

[54] POLYESTER FILM

[75] Inventors: Kwang-Jin Song; Byeong-Ho Cho; Yong-Won Kim, all of Suwon, Rep. of Korea

[73] Assignee: SKC Limited, Rep. of Korea

[21] Appl. No.: 962,937

[22] Filed: Oct. 19, 1992

[30] Foreign Application Priority Data

Dec. 27, 1991 [KR] Rep. of Korea ............... 91-24673

[51] Int. Cl.$^5$ ................................ C08K 5/41
[52] U.S. Cl. ......................... 524/167; 525/437; 525/444; 525/535; 524/155; 524/174; 264/210.7
[58] Field of Search .......... 525/437, 444, 535; 524/155, 167, 174; 264/210.7

[56] References Cited

FOREIGN PATENT DOCUMENTS 58-012910 10/1983 Japan .

OTHER PUBLICATIONS

CA116(10):85029c.
CA114(14):1238316.
CA115(26):281562q.
CA109(4):23993j.
CA108(22):187837s.

*Primary Examiner*—John Kight, III
*Assistant Examiner*—S. A. Acquah
*Attorney, Agent, or Firm*—Thomas J. Dodd

[57] ABSTRACT

The present invention relates to a biaxially oriented polyester film comprising a metallic alkylbenzene sulfonate derivative of formula(I), polyethylene glycol and, optionally, bis(4-β-hydroxyalkoxyphenyl) sulfones of formula(II), which has improved antistatic property, clarity, mechanical properties and heat resistance:

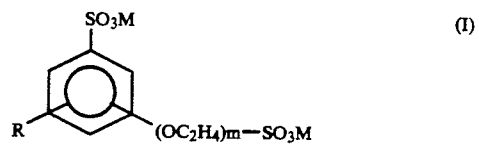

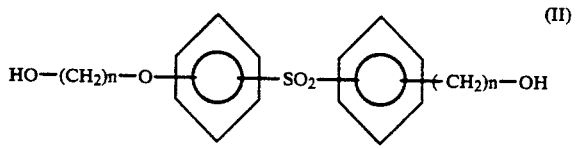

wherein:
R represents an optionally substituted $C_{8-25}$ alkyl group;
M represents an alkali or alkali earth metal;
m is an integer of 100 or fewer; and
n is an integer from 1 to 10.

9 Claims, No Drawings

POLYESTER FILM

FIELD OF THE INVENTION

The present invention relates to a polyester film and; more particularly, to a biaxially oriented polyester film comprising a metallic alkylbenzene sulfonate derivative, polyethylene glycol and, optionally, a bis(4-β-hydroxyalkoxyphenyl)sulfone, which has improved antistatic property, clarity, mechanical property and heat resistance.

BACKGROUND OF THE INVENTION

In general, polyesters such as polyethylene terephthalate are possessed with good chemical stability, physical and mechanical strength, heat resistance, chemical resistance and electrical insulation property; and, therefore, have been used for preparing various articles including magnetic tapes, photographic film, electrical insulating materials, capacitors and wrapping materials.

However, such polyester films are liable to generate and accumulate static electricity due to their high dielectricity; and, as a result, there may arise several problems in connection with, e.g., their preparation, printing and/or wrapping process: that is, they tend to adhere to a processing roll or among themselves; to create electric shock or spark; and to contaminate the surface of the film easily by way of attracting dusts. Moreover, the state of printing and coating onto the film tends to become non-uniform due to their generally poor receptivity to ink or coating compositions.

To solve the above-mentioned problems, many attempts have been made. For instance, to improve the antistatic property, an antistatic agent has been incorporated into a polyester film by way of, e.g., impregnating polyester with a polyalkylene glycol or a mixture of a polyalkylene glycol and a metallic sulfonate derivative. Japanese Patent Publication No. 12910/1983 discloses a biaxially oriented polyester film incorporated with polyethylene glycol and a metallic sulfonate derivative. Also, Japanese Patent Publication No. 15148/1984 describes a polyester composition formulated with a styrene oligomer and a metallic alkylsulfonate. However, such antistatic additives are not normally dispersed or mixed well in the polyester composition, which makes the antistatic property of the polyester film non-uniform. Further, the presence of such antistatic agents often deteriorates the clarity, mechanical property and/or surface tension of the film, thereby adversely affecting the coating or printing process of the film.

SUMMARY OF THE INVENTION

The present inventors have discovered that a biaxially oriented polyester film comprising a metallic alkylbenzene sulfonate derivative, polyethylene glycol and, optionally, a bis(4-β-hydroxyalkoxyphenyl) sulfone has markedly improved antistatic property, clarity, mechanical properties and heat resistance.

Accordingly, a primary object of the present invention is to provide said biaxially oriented polyester film comprising the above-mentioned additive components with surprisingly improved functional characteristics.

DETAILED DESCRIPTION OF THE INVENTION

The present invention provides a biaxially oriented polyester film having 70% or more by weight of polyethylene terephthalate (PET), which comprises: a metallic alkylbenzene sulfonate derivative of formula(I); polyethylene glycol; and, optionally, a bis(4-β-hydroxyalkoxyphenyl) sulfone of formula(II):

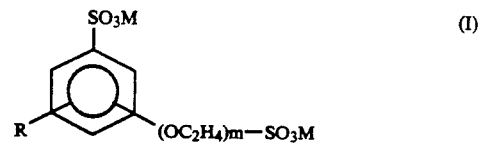

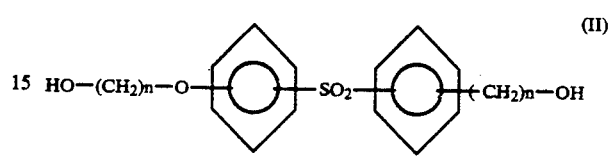

wherein:
R represents an optionally substituted $C_{8-25}$ alkyl group;
M represents an alkali or alkaline earth metal such as Li, Na, K and Mg;
m is an integer of 100 or fewer; and
n is an integer from 1 to 10.

The polyester film of the present invention having 70% or more by weight of PET (being prepared by, e.g., polycondensation of dimethyl terephthalate with ethylene glycol) preferably has an intrinsic viscosity of 0.4–1.0 dl/g, more preferably, 0.5–0.8 dl/g as measured at the concentration of 0.3 g per 25 ml of ortho-chlorophenol and at the temperature of 35° C.

In the compound of formula(I) employed in the present invention, R is an optionally substituted $C_{8-25}$ alkyl group. In formula(I), m is an integer of 100 or fewer, preferably of 50 or fewer. The compound of formula(I) has preferably an acid value of 1.0 mg KOH/g or less, more preferably, 0.7 mg KOH/g or less. If the acid value is greater than 1.0 mg KOH/g, the dispersibility becomes so poor that fish eyes are produced on the surface of the film; and, the film may become easily discolored.

The compound of formula(I) may be employed in an amount ranging from 0.05 to 10% by weight.

Representative compounds of formula(I) may include the compounds having the following formula and mixtures thereof.

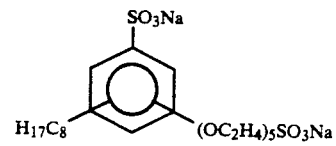

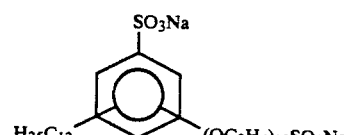

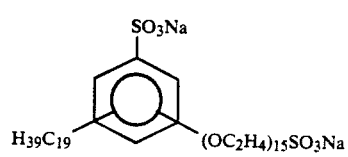

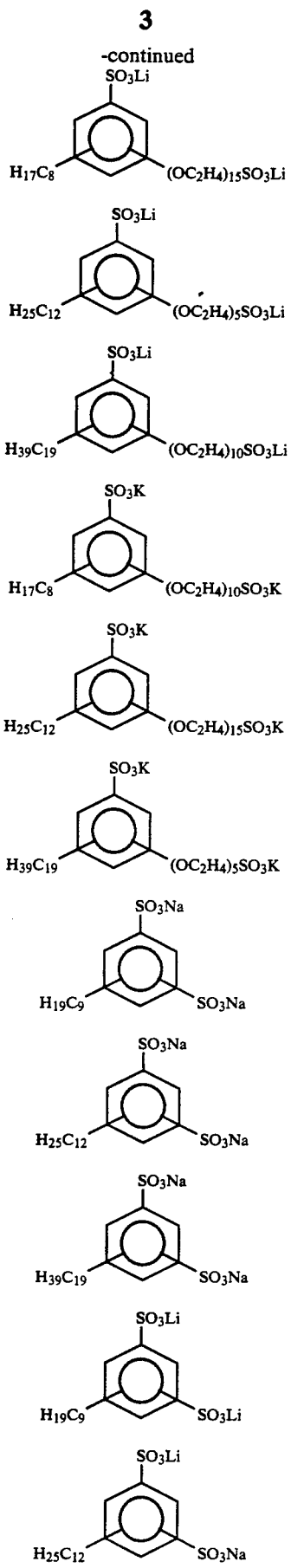
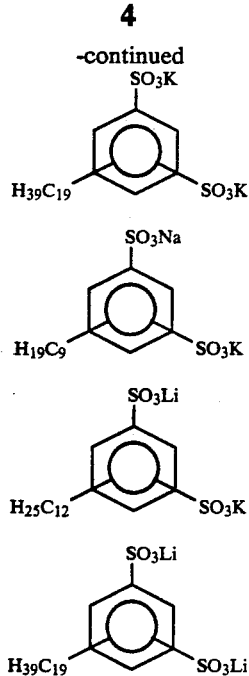

Polyethylene glycol employed in the present invention may have a molecular weight(MW) ranging from 500 to 100,000, preferably from 500 to 50,000. Said polyethylene glycol may be employed in an amount of 0.1 to 10%, preferably 0.5 to 9% by weight for the preparation of the polyester film of the present invention.

The compound of formula(I) and polyethylene glycol should be preferably introduced together to the polyester resin so as to obtain the desired results.

The polyester film of the present invention may optionally comprise bis(4-β-hydroxyalkoxyphenyl) sulfones of formula(II), wherein n is an integer from 1 to 10.

The compound of formula(II) may be employed in an amount ranging from 0.1 to 10% by weight, preferably 0.5 to 8.0% by weight.

The compound of formula(II) has excellent compatibility with the compound of formula(I). Accordingly, the polyester film comprising said compound has improved heat resistance as well as good antistatic property and clarity.

Representative examples of the compound of formula(II) may include bis(4-β-hydroxymethylphenyl) sulfone, bis(4-β-hydroxyethoxyphenyl) sulfone, bis(4-β-hydroxypropoxyphenyl) sulfone, bis(4-β-hydroxybutoxyphenyl) sulfone, bis(4-β-hydroxypentoxyphenyl) sulfone, bis(4-β-hydroxyhexoxyphenyl) sulfone, bis(4-β-hydroxyheptoxyphenyl) sulfone, bis(4-β-hydroxyoctoxyphenyl) sulfone, bis(4-β-hydroxynonoxyphenyl) sulfone, bis(4-β-hydroxydecoxyphenyl) sulfone, and mixtures thereof.

The above-mentioned additives may be added simultaneously to PET at anytime during the preparation process of the polyester film of the present invention. If the compounds are added during the polycondensation process, they may be added at anytime before the completion of the polycondensation process, preferably during the transesterification or about 30 minutes before the completion of polycondensation. Alternatively, the metallic alkylbenzene sulfonate derivative and polyethylene glycol may be simultaneously added to PET during the compounding process to prepare a highly concentrated polyester master chip; and, the chip thus prepared may be then mixed with a polyester which does not contain the additives at a desired ratio and then the mixture may be subjected again to the melting extrusion process.

Specifically, the polyester film of the present invention may be prepared as follows. For example, the biaxially oriented polyester film of the present invention may be prepared by melt-extruding a polyester resin comprising the above-mentioned additive components into a non-oriented sheet having an intrinsic viscosity of 0.4 to 1.0 dl/g by using a T-die method or inflation method followed by orienting the sheet biaxially. The orientation can be accomplished by using a conventional orientation method of polyester resin. For example, as described in U.S. Pat. No. 2,823,421, the orienting process may be conducted at a temperature ranging from 60° to 150° C. and at an orientation degree of 2.5 to 6.0 magnification in both the lateral and the longitudinal directions. After the orientation process is completed, a thermal treatment process may be conducted at a temperature ranging from 160° to 240° C. for a period of about 20 seconds to provide the polyester film of the present invention with a surface resistance of $10^{16}\Omega$ or less.

Preferably, the polyester film of the present invention has a crystal size of 35 Å or more in the (010) face direction and of 40 Å or more in the (100) face direction and a specific gravity of 1.380 or more to obtain a good antistatic property and clarity.

The polyester film of the present invention may have a thickness ranging from 2.0 to 250 μm, which may be suitably controlled depending on the use of the film. Further, the surface of the film may be treated with, e.g., corona discharge treatment, coating with other resins, lamination, coextrusion and the like.

The following Examples illustrate the present invention more specifically, without limiting the scope of the invention.

The properties of the polyester films prepared in Examples and Comparative Examples were evaluated by the following methods. Unless otherwise instructed, all units, percentages, parts, etc. as used in the Examples and Comparative Examples are by weight.

(1) Antistatic Property

The surface resistivity of the film was measured by using an insulation resistance measurement apparatus, marketed by Hewlett-Packard Company of United States, at 20° C. and at the relative humidity(RH) of 65%. The applied voltage was 500 V. The measured value was given in ohm($\Omega$) unit. As the value of the surface resistivity decreases, the antistatic property increases.

(2) Clarity

The clarity of the film was evaluated by using a hazemeter marketed by Gardner Neotec Company and using a C-light source. The haze value(in %) was determined as (the amount of scattered light)/(the total amount of transmitted light and scattered light). As the haze value decreases, the clarity of the film increases.

(3) Mechanical Properties

The tests for the mechanical properties of the film were conducted by using Universal Testing Machine(UTM), which is a product of Instron, Inc. The film having the size of 50 mm(in length)×200 mm (in width)×100 μm (in thickness) was extended at the speed of 200 mm/min at a room temperature and RH of 65%. The chart of load-elongation was prepared; and the following values were calculated therefrom:

Elongation at break(%): determined by dividing the length extended until the film was broken off with the original length of the film.

Strength at break(kg/mm$^2$): determined by dividing the force required to break the film at a room temperature with the area of the original film.

The film having a low value of elongation at break and high value of strength at break would be considered to have good mechanical properties.

(4) Size of Crystal

The size of crystal in film was measured in angstrom(Å) at a wide angle mode(WAXS) using an X-ray analyzer marketed by Likaku Co. of Japan.

(5) Specific Gravity

The specific gravity was measured in a density-gradient tube comprising carbon tetrachloride and n-hepthane at 25° C. using a floation method.

(6) Heat Resistance

The heat resistance was determined by heating the polyester film at 270° C. for 10 minutes and measuring the amount of acetaldehyde produced using a gas chromatography marketed by shimazu Co. of Japan. As the amount of acetaldehyde produced increases, the heat resistance decreases.

EXAMPLES 1 TO 3

After completion of the transesterification process of a conventional polycondensation of PET according to the method described in U.S. Pat. Nos. 2,465,319 and 3,024,220, 10.0% by weight of polyethylene glycol having MW of 20,000 and 5.0% by weight of the metallic alkylbenzene sulfonate derivative represented in Table 1 on the basis of the total dry weight of film were introduced to produce a polymer(polymer A) having the intrinsic viscosity of 0.65 dl/g. Further, another PET(polymer B) with the intrinsic viscosity of 0.65 dl/g, but without any of the above additive components, was prepared by the same method as described above.

Both polymers thus prepared were mixed at a ratio so that amounts of the additive components may become as defined in Table 1. Each of the resulting mixtures was melt-extruded into a non-oriented sheet by a conventional method described in U.S. Pat. Nos. 2,736,066 and 2,765,492. The sheet was oriented at a magnification of 3.5 in the longitudinal direction at 80° C. and at a magnification of 4.0 in the lateral direction at 120° C. The oriented sheet was heat-treated at 230° C. for 20 seconds to produce a biaxially oriented film having the thickness of 100 μm, which was evaluated for determining the properties thereof by employing the methods previously described. The results for evaluation are also shown in Table 1.

EXAMPLES 4 TO 6

To PET having the intrinsic viscosity of 0.65 dl/g prepared by a conventional polycondensation process were simultaneously charged 20.0% by weight of polyethylene glycol having MW of 50,000 and 10.0% by weight of the metallic alkylbenzene sulfonate derivative represented in Table 1 on the basis of the total dry weight of the film. The resulting mixture was melt-extruded to produce a highly concentrated master chip(polymer C) having the intrinsic viscosity of 0.62 dl/g.

On the other hand, another PET(polymer D) having the intrinsic viscosity of 0.65 dl/g, but without any of the above additive components, was prepared by the same method as described above.

Both polymers thus prepared were mixed with each other at a ratio so that the amount of the additive components may become as defined in Table 1. The resulting mixture was melt-extruded into a non-oriented sheet by a conventional method. The sheet was oriented at a magnification of 3.5 in the longitudinal direction at 80° C. and at a magnification of 4.0 in the lateral direction at 120° C. The oriented sheet was heat-treated at 230° C. for 20 seconds to produce a biaxially oriented film having the thickness of 100 μm, which was evaluated for determining the properties thereof by employing the methods previously described. The results are also shown in Table 1.

EXAMPLE 7

The procedures of Example 5 were repeated except that 3.0% by weight of bis(4-β-hydroxymethoxyphenyl) sulfone was further added during the transesterification process of a conventional polycondensation. The results are also shown in Table 1.

COMPARATIVE EXAMPLES 1 TO 3

The procedures of Examples 1 to 3 were repeated except that the added components, their amount and the crystalline structure of the produced film were as shown in Table 1. The evaluation results of the film thus prepared are also shown in Table 1.

COMPARATIVE EXAMPLE 4

The procedures of Example 5 were repeated except that the acid value of the metallic alkylbenzene sulfonate derivative employed was 3.00 mg KOH/g. The evaluation results are also shown in Table 1.

COMPARATIVE EXAMPLE 5

The procedures of Example 5 were repeated except that the MW of polyethylene glycol was 200,000. The evaluation results of the film thus prepared are also shown in Table 1.

COMPARATIVE EXAMPLE 6

The procedures of Example 5 were repeated except that the amount of the metallic alkylbenzene sulfonate derivative employed was 11.0% by weight and the amount of the polyethylene glycol employed was 25.0% by weight. The evaluation results of the film thus prepared are also shown in Table 1.

TABLE 1

| | Additives | | | | | |
|---|---|---|---|---|---|---|
| | Sulfonate Derivative | | Acid Value (mgKUM/g) | Polyethylene Glycol | | Bis(4-β-hydroxymethoxyphenyl)sulfone Amount (wt %) |
| | Component | Amount (wt %) | | MW | Amount (wt %) | |
| EXAMPLE 1 | I-1 | 1.2 | 0.01 | 2 | 2.4 | — |
| 2 | " | 1.0 | 0.01 | 2 | 2.0 | — |
| 3 | " | 0.8 | 0.01 | 2 | 1.6 | — |
| 4 | I-2 | 1.2 | 0.01 | 5 | 2.4 | — |
| 5 | " | 1.0 | 0.01 | 5 | 2.0 | — |
| 6 | " | 0.8 | 0.01 | 5 | 1.6 | — |
| 7 | " | 1.0 | 0.01 | 5 | 2.0 | 3.0 |
| COMPARATIVE EXAMPLE | | | | | | |
| 1 | I-1 | 1.2 | 0.01 | 2 | 2.4 | — |
| 2 | " | 1.2 | 0.01 | — | — | — |
| 3 | " | — | — | 2 | 2.4 | — |
| 4 | I-2 | 1.0 | 3.00 | 5 | 2.0 | — |
| 5 | " | 1.0 | 0.01 | 20 | 2.0 | — |
| 6 | " | 11.0 | 0.01 | 5 | 25.0 | — |

| | Evaluation Results | | | | | | | |
|---|---|---|---|---|---|---|---|---|
| | Surface Resistance (Ω) | Haze (%) | Mechanical Properties (in long. dir.) | | Size of Crystal (Å) | | Specific Gravity | Amount of Acetaldehyde Produced |
| | | | Strength (kg/mm²) | Elongation (%) | (010) | (100) | | |
| EXAMPLE | | | | | | | | |
| 1 | $10^{10}$ | 2.5 | 25.4 | 120.2 | 55 | 50 | 1.390 | 21.0 |
| 2 | $10^{11}$ | 2.3 | 26.5 | 110.5 | 60 | 57 | 1.395 | 19.5 |
| 3 | $10^{11}$ | 2.0 | 25.7 | 114.3 | 59 | 58 | 1.394 | 17.3 |
| 4 | $10^{11}$ | 2.3 | 25.4 | 120.0 | 56 | 57 | 1.395 | 18.8 |
| 5 | $10^{10}$ | 2.0 | 26.6 | 115.9 | 62 | 59 | 1.395 | 19.8 |
| 6 | $10^{11}$ | 2.0 | 26.3 | 118.8 | 70 | 66 | 1.398 | 17.9 |
| 7 | $10^{11}$ | 2.1 | 25.9 | 110.6 | 56 | 59 | 1.395 | 8.20 |
| COMPARATIVE EXAMPLE | | | | | | | | |
| 1 | $10^{16}$ | 2.5 | 27.2 | 105.8 | 32 | 35 | 1.378 | 20.5 |
| 2 | $10^{17}$ | 6.7 | 26.7 | 117.3 | 33 | 38 | 1.379 | 19.8 |
| 3 | $10^{17}$ | 2.3 | 25.8 | 121.4 | 33 | 37 | 1.379 | 20.3 |
| 4 | $10^{15}$ | 3.5 | 18.6 | 179.9 | 33 | 38 | 1.379 | 30.9 |
| 5 | $10^{14}$ | 28.5 | 20.0 | 155.6 | 75 | 80 | 1.399 | 35.9 |

TABLE 1-continued

| | 6 | $10^{14}$ | 68.6 | 10.2 | 201.9 | 68 | 62 | 1.399 | 40.3 |

*I-1:

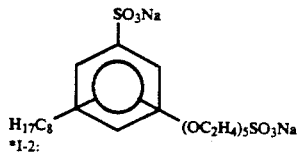

*I-2:

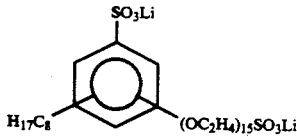

As shown in Table 1 above, the biaxially oriented polyester film of the present invention comprising a metallic alkylbenzene sulfonate derivative and polyethylene glycol is possessed with a good antistatic property, clarity and mechanical property; and, therefore, very useful for various applications including packing materials, graphic art and magnetics which are required both the clarity and antistatic property. Particulary, the polyester film further comprising bis(4-β-hydroxyalkoxyphenyl) sulfone has excellent heat resistance to inhibit the generation of acetaldehyde. Accordingly, it is also useful for the wrapping process at high temperature.

While the invention has been described in connection with the above specific embodiments, it should be recognized that various modifications and changes as may be apparent to those skilled in the art to which the invention pertains may be made and also fall within the scope of the invention as defined by the claims that follow.

What is claimed is:

1. A biaxially oriented polyester film having 70% or more by weight of polyethylene terephthalate, which further comprises 0.05 to 10% by weight of a metallic alkylbenzene sulfonate derivative of formula(I); 0.1 to 10% by weight of polyethylene glycol having a molecular weight ranging from 500 to 100,000; and 0.1 to 10% by weight of bis(4-β-hydroxyalkoxyphenyl) sulfone of formula(II) on the basis of the total dry weight of film:

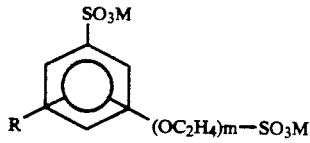

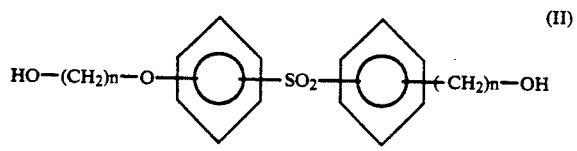

wherein:

R represents an optionally substituted $C_{8-25}$ alkyl group;

M represents an alkali or alkaline earth metal;

m is an integer of 100 or fewer; and n is an integer from 1 to 10.

2. The biaxially oriented polyester film of claim 1 wherein the film has an intrinsic viscosity ranging from 0.5 to 1.0 dl/g.

3. The biaxially oriented film of claim 1 wherein m is an integer of 50 or fewer.

4. The biaxially oriented film of claim 1 wherein the compound of formula(I) has an acid value of 1.0 mg KOH/g or less.

5. The biaxially oriented film of claim 1 wherein polyethylene glycol has a molecular weight ranging from 500 to 50,000.

6. The biaxially oriented film of claim 1 which comprises 0.5 to 8.0% by weight of polyethylene glycol on the basis of the total dry weight of film.

7. The biaxially oriented polyester film of claim 1 wherein the film has a surface resistance of $10^{16}$ Ω or less.

8. The biaxially oriented polyester film of claim 1 wherein the film has a crystal size of 35 Å or more in the (010) face direction and of 40 Å or more in the (100) face direction.

9. The biaxially oriented polyester film of claim 1 wherein the film has a specific gravity of 1.380 or more.

* * * * *